United States Patent
Watson et al.

(10) Patent No.: US 10,666,475 B2
(45) Date of Patent: May 26, 2020

(54) TECHNIQUES FOR PHASE MODULATED SIGNALS HAVING POOR AUTOCORRELATION

(71) Applicant: BAE Systems Information and Electronic Systems Integration Inc., Nashua, NH (US)

(72) Inventors: William D. Watson, Pepperell, MA (US); Prabahan Basu, Lexington, MA (US); Jonathan P. Beaudeau, Littleton, MA (US); David J. Couto, Pepperell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/173,796

(22) Filed: Oct. 29, 2018

(65) Prior Publication Data

US 2020/0136870 A1 Apr. 30, 2020

(51) Int. Cl.
*H04J 13/10* (2011.01)
*H04L 27/227* (2006.01)
*H04L 27/20* (2006.01)

(52) U.S. Cl.
CPC .......... *H04L 27/2278* (2013.01); *H04L 27/20* (2013.01); *H04J 13/10* (2013.01)

(58) Field of Classification Search
USPC .......................................................... 704/217
See application file for complete search history.

(56) References Cited

U.S. PATENT DOCUMENTS

| 2004/0068401 | A1* | 4/2004 | Herre | G10H 1/40 704/217 |
| 2006/0082442 | A1* | 4/2006 | Sundstrom | G01S 13/756 340/10.2 |

OTHER PUBLICATIONS

Hao He et al., "Waveform Design for Active Sensing Systems: A Computational Approach", Aug. 27, 2012, Cambridge University Press, Cambridge, UK. pp. 17-38.
Marvin K. Simon et al., "Spread Spectrum Communications Handbook", Revised Edition, 1994, McGraw-Hill, Inc., Texas.
(Continued)

*Primary Examiner* — Eva Y Puente
(74) *Attorney, Agent, or Firm* — Finch & Maloney PLLC; Scott J. Asmus (57) ABSTRACT

An electronic transmitter includes: a modulator to phase modulate a carrier signal with a baseband signal using a phase modulation sequence; and an emitter to emit the phase modulated signal. The phase modulated signal has poor autocorrelation, has a corresponding mismatched filter based on the phase modulation sequence, and is configured to demodulate into the baseband signal through poor cross-correlation with the mismatched filter. Sometimes, the transmitter is part of a sensing apparatus, where the emitter emits the phase modulated signal at a target and the emitted signal reflects off the target. The sensing apparatus includes a receiver that has a collector to collect the reflected signal, and a demodulator to demodulate the collected signal into the baseband signal through the poor cross-correlation with the mismatched filter. Sometimes, the transmitter is part of a communication system, where the emitter emits the phase modulated signal to an intended recipient.

20 Claims, 8 Drawing Sheets

(56) References Cited

OTHER PUBLICATIONS

Joseph Tabrikian et al., "Barankin Bound for Source Localization in an Uncertain Ocean Environment", Nov. 1999, IEEE Transactions on Signal Processing, vol. 47, No. 11, IEEE, pp. 2917-2927.
Alon Pinkus et al., "Barankin Bound for Range and Doppler Estimation Using Orthogonal Signal Transmission", Apr. 24-27, 2006, 2006 IEEE Conference on Radar, IEEE, pp. 94-99.
Seymour Stein, "Algorithms for Ambiguity Function Processing", Jun. 1981, IEEE Transactions on Acoustic, Speech, and Signal Processing, vol. ASSP-29, No. 3, IEEE, pp. 588-599.
William Watson et al., "4D CAF Localization of Co-located, Moving and RF Coincident Emitters", 2016, Milcom 2016 Track 1—Waveforms and Signal Processing, IEEE, pp. 948-951.
Robert J. Mcaulay et al., "Barankin Bound on Parameter Estimation", Nov. 1971, IEEE Transactions on Information Theory, vol. IT-17, No. 6, IEEE, pp. 669-676.
William A. Gardner, "Statistical Spectral Analysis: A Nonprobabilistic Theory", 1988, Prentice Hall Information and System Sciences Series, Prentice Hall, Englewood Cliffs, NJ, 591 pages.
William A. Gardner, "Cyclostationarity in Communications and Signal Processing", Jan. 1, 1994, IEEE.
Hao He et al., "Waveform Design for Active Sensing Systems: A Computational Approach", Aug. 27, 2012, Cambridge University Press, Cambridge, UK.

* cited by examiner

TECHNIQUES FOR PHASE MODULATED SIGNALS HAVING POOR AUTOCORRELATION

FIELD OF THE DISCLOSURE

This disclosure relates to techniques for phase modulated signals having poor autocorrelation.

BACKGROUND

Electromagnetic waveforms are emitted as signals in a variety of applications. In some of these applications, these emitted signals reach intended targets or recipients. These signals can convey useful information in many ways. However, such signals can also be detected, intercepted, or exploited by any receiver in the path of the emission. As such, there are a number of non-trivial issues associated with such emissions.

Although the following Detailed Description will proceed with reference being made to illustrative embodiments, many alternatives, modifications, and variations thereof will be apparent to those in light of the present disclosure.

DETAILED DESCRIPTION

According to various embodiments of the present disclosure, an electronic transmitter is provided. In some such embodiments, the transmitter is for an electronic sensing apparatus (like a radar system), while in some other such embodiments, the transmitter is for an electronic communication system. The transmitter includes a modulator to phase modulate a carrier signal with a baseband signal using a phase modulation sequence. The phase modulated signal has poor autocorrelation (such as flat), making it difficult for different unintended recipients to identify a consistent point in the transmission (which could allow the unintended recipients to geolocate the transmitted signal).

In addition, the phase modulated signal has a corresponding mismatched filter (similar to a security key and known only to intended recipients) based on the phase modulation sequence and with which the phase modulated signal has poor cross-correlation (such as spiked), making it possible for an intended recipient to recover the baseband signal from the transmitted signal. Accordingly, the phase modulated signal is configured to demodulate into the baseband signal through the poor cross-correlation with the mismatched filter. The transmitter further includes an emitter to emit the phase modulated signal. The poor autocorrelation thwarts efforts by unintended recipients of the emitted signal to detect, intercept, or exploit the emitted signal, such as geolocating the emitter.

General Overview

As mentioned above, there are a number of non-trivial issues associated with emissions of signals composed of electromagnetic waveforms. While such emissions have useful applications, they can also be detected, intercepted, or exploited by any recipient in their path. Such unintended reception can be used, for example, to detect the presence of the emissions, to decipher the structure or contents of the emissions, and/or to geolocate the source of the emissions, to name a few of the undesired uses of the signals. Once an emitter's location is known, that emitter can be targeted by adversarial forces. To this end, the ability to thwart or otherwise inhibit the interception of transmitted signals as well as the geolocation or tracking of their emitter is desirable from a tactical standpoint.

Thus, techniques are disclosed that allow for the instantiation of waveforms designed to yield very poor geolocation solutions. In more detail, and according to one embodiment, a carrier signal is phase modulated by a baseband signal prior to emission so that the phase modulated signal has poor autocorrelation (such as a flat autocorrelation, e.g., all the autocorrelation values are within 10% of the average autocorrelation value). The autocorrelation of the signal can refer to how well the emitted signal lines up with itself versus time-shifted (e.g., delayed or advanced) copies of itself. An excellent autocorrelation (e.g., spiked and maximal when no delay is present, flat and minimal otherwise) is usually desired in an emission, as it can, for example, make it easier for an intended recipient to recover the baseband signal using a matched filter. A poor autocorrelation can be, for example, when the normalized autocorrelation values are all close to 1.0, such as all being greater than 0.9 (or similar lower bound, such as 0.8 or 0.95).

For similar reasons, an excellent autocorrelation can also make it easier for multiple unintended recipients to geolocate the emission source, such as by pairs of unintended recipients comparing consistent points in the received emissions to determine relative time delays (e.g., range estimates) between the recipients and the emission source. By contrast, a poor autocorrelation (such as flat and maximal) can make it difficult or impossible for multiple unintended recipients to find such consistent points in the emission. This poor autocorrelation can make it difficult or impossible to get accurate or consistent range estimates (e.g., time delays) from the unintended recipients to the emission source.

The phase modulated signal also has a corresponding mismatched filter, such as a unique mismatched filter (that functions similar to a security key) known only to intended recipients. In addition, the phase modulated signal is configured to demodulate into the baseband signal through poor cross-correlation (such as a spiked cross-correlation, e.g., a single point defining the spike and the remaining points being no more than 10% of the spike's value) with the mismatched filter. The cross-correlation of the signal and the mismatched filter can refer to how well the emitted signal lines up with different time delays of the mismatched filter. Normally, an emitted signal has good cross-correlation (e.g., flat) with a mismatched filter. A poor cross-correlation (such as spiked) can allow the intended recipient (e.g., the only recipient aware of the mismatched filter) to recover the baseband signal by applying the mismatched filter to the emitted signal. A poor cross-correlation can be, for example, when the normalized cross-correlation values include the spike at 1.0, with the remaining points being no more than 0.1 (or similar value close to 0, such as 0.2 or 0.05).

In one such embodiment, an electronic transmitter includes a modulator to phase modulate the carrier signal with the baseband signal using a phase modulation sequence, and an emitter to emit the phase modulated signal. In one example use case, an electronic sensing (such as radar) apparatus includes the transmitter, with the emitter emitting the phase modulated signal at a target and the emitted signal reflecting off the target. The sensing apparatus also includes a receiver that has a collector to collect the reflected signal, and a demodulator to demodulate the collected signal into the baseband signal through the poor cross-correlation with the mismatched filter. In another example use case, an electronic communication system includes the transmitter, with the emitter emitting the phase modulated signal to an intended recipient. The communication system also includes a receiver at the intended recipient and that has a collector to collect the emitted signal, and a demodulator to demodulate the collected signal into the baseband signal through the poor cross-correlation with the mismatched filter. Numerous other example embodiments, use case, and configurations will be apparent in light of this disclosure.

System Architecture

Figure 1:
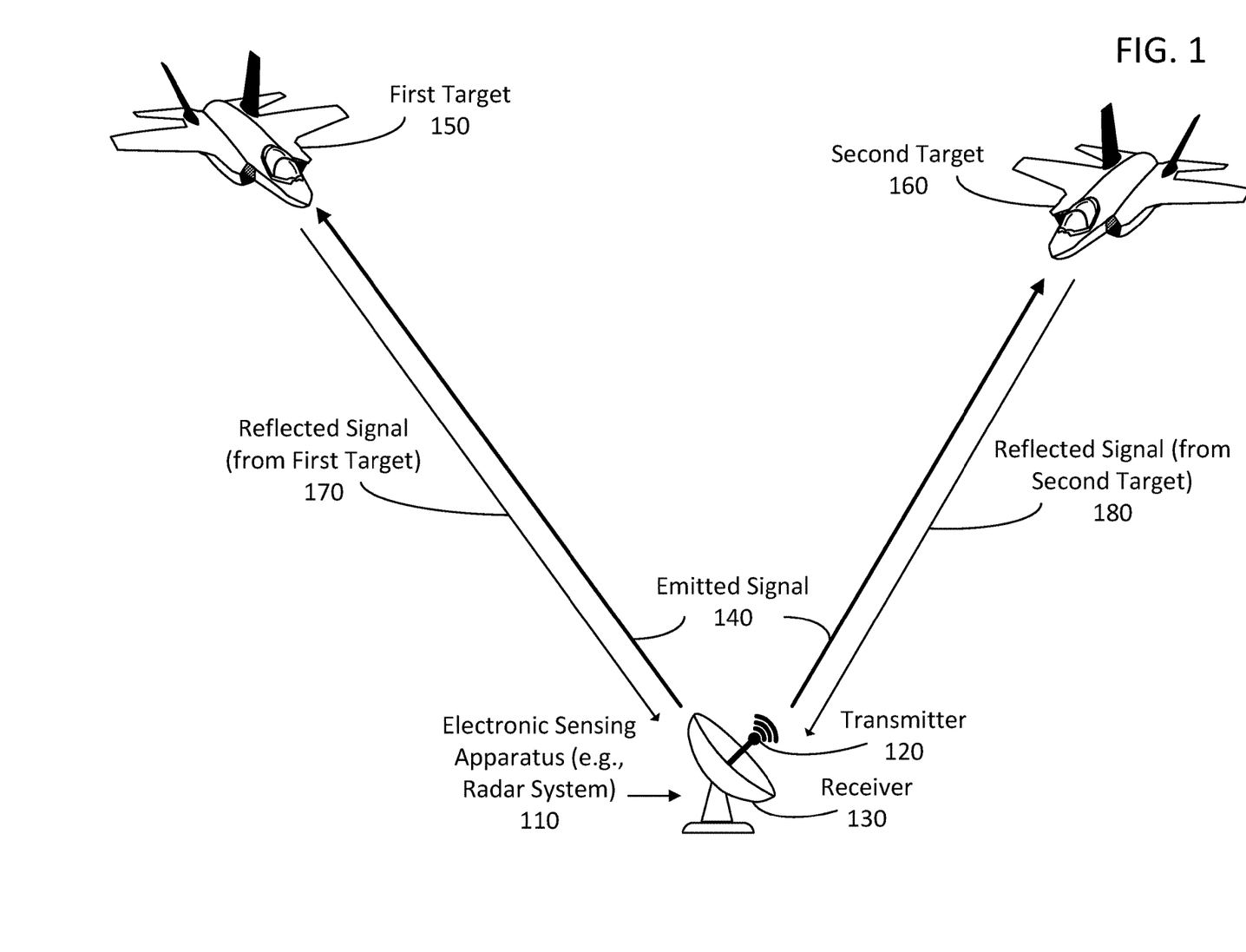
FIG. 1 is a schematic diagram of an example use case for a remote sensing apparatus (such as a radar system) having a transmitter for phase modulating and emitting a signal having poor autocorrelation, and a receiver for collecting and demodulating reflected forms of the emitted signal, according to an embodiment of the present disclosure.

FIG. 1 is a schematic diagram of an example use case for a remote sensing apparatus 110 (such as a radar system) having a transmitter 120 for phase modulating and emitting a signal 140 having poor autocorrelation, and a receiver 130 for collecting and demodulating reflected forms 170 and 180 of the emitted signal 140, according to an embodiment of the present disclosure. In FIG. 1, a first target 150 and a second target 160 are being sensed by the sensing apparatus 110 using the emitted signal 140. The emitted signal 140 reflects off the first target 150, a portion of the reflected signal 170 returning to the sensing apparatus 110. Likewise, the emitted signal 140 also reflects off the second target 160, a portion of the reflected signal 180 returning to the sensing apparatus 110. The transmitter 120 phase modulates a carrier signal with a baseband signal prior to emitting the phase modulated signal as the emitted signal 140. The receiver 130 collects the reflected signals 170 and 180 and demodulates them. This, for example, helps the sensing apparatus 110 determine whether any incoming radiation (such as the reflected signal 170 and the reflected signal 180) originated from the emitted signal 140 of the transmitter 120.

In some embodiments, and as described in further detail below, the transmitter 120 phase modulates a carrier signal with a baseband signal using a phase modulation sequence to create a phase modulated signal having poor autocorrelation prior to emitting the phase modulated signal as the emitted signal 140. In some such embodiments, the receiver 130 demodulates the collected signals (e.g., from the reflected signals 170 and 180) to recover the baseband signal. Accordingly, while the first target 150 and the second target 160 may receive the emitted signal 140 and attempt to detect, intercept, or exploit the signal, the poor autocorrelation of the emitted signal 140 makes it difficult to coordinate such efforts and, for example, geolocate the sensing apparatus 110 from the received signal.

Figure 2:
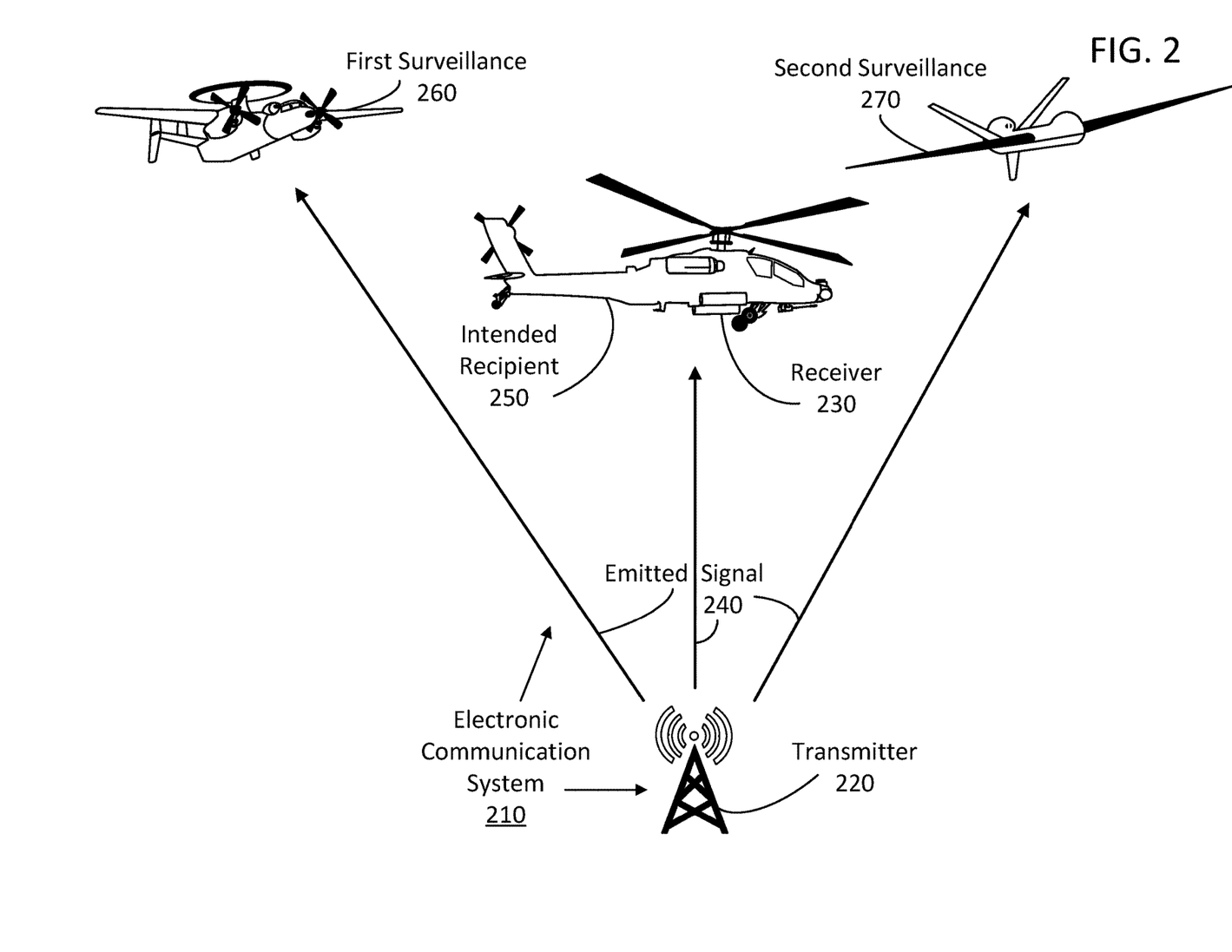
FIG. 2 is a schematic diagram of an example use case for an electronic communication system having a transmitter for phase modulating and emitting a signal having poor autocorrelation, and a receiver for collecting and demodulating the emitted signal, according to an embodiment of the present disclosure.

FIG. 2 is a schematic diagram of an example use case for an electronic communication system 210 having a transmitter 220 for phase modulating and emitting a signal 240 having poor autocorrelation, and a receiver 230 for collecting and demodulating the emitted signal 240, according to an embodiment of the present disclosure. In FIG. 2, the receiver 230 is at an intended recipient 250 of the emitted signal 240, allowing the transmitter 220 to communicate with the intended recipient 250. For example, the transmitter 220 can phase modulate a carrier signal with a baseband signal to generate the emitted signal 240, while the receiver 230 collects the emitted signal 240 and demodulates the collected signal to recover the baseband signal. However, because of the transmission or broadcast pattern of the emitted signal 240, unintended recipients, including first surveillance 260 and second surveillance 270, may also receive the emitted signal 240. For example, the first surveillance 260 and the second surveillance 270 may be able to detect, intercept, or exploit the emitted signal 240.

While there are many possible unintended uses of the emitted signal 240 by the first surveillance 260 and the second surveillance 270, for ease of description, embodiments of the present disclosure are described in terms of three general classes (reception, interception, and exploitation) of unintended use. However, in other embodiments, other unintended uses are also included, as would be apparent in light of the present disclosure.

When referring to the detection of the emitted signal 240 in the present disclosure, the unintended use is the observation of the emitted signal 240 (e.g., being aware of the emitted signal 240, such as being able to separate or discern the emitted signal 240 from other electromagnetic radiation). By contrast, when referring to the interception of the emitted signal 240 in the present disclosure, the unintended use is the ability to determine features of the emitted signal 240, such as features that allow identification of the type, format, demodulated form, and perhaps even content of the emitted signal 240. In other words, while detection allows one to know that there is an emitted signal 240 being used for communication, remote sensing, or some similar use, interception provides clues as to the intended use, form, and content of the emitted signal 240. By further contrast, when referring to the exploitation of the emitted signal 240 in the present disclosure, the unintended use is the ability to geolocate (or track or, more broadly, localize) the transmitter 220 of the emitted signal 240.

While interception or exploitation of the emitted signal 240 implies detection of the emitted signal 240, the detection of the emitted signal 240 does not imply interception or exploitation of the emitted signal 240. In addition, the interception of the emitted signal 240 can take place independently of the exploitation of the emitted signal 240. That is, the first surveillance 260 and the second surveillance 270 may be able to intercept the emitted signal 240 but not exploit the signal, or the first surveillance 260 and the second surveillance 270 may be able to exploit the emitted signal 240 but not intercept the signal, or the first surveillance 260 and the second surveillance 270 may be able to both intercept the emitted signal 240 and exploit the signal.

In some embodiments, the transmitter 220 phase modulates a carrier signal with a baseband signal to create a phase modulated signal having poor autocorrelation prior to emitting the phase modulated signal as the emitted signal 240. In some such embodiments, the receiver 230 demodulates the collected signals to recover the baseband signal. Accordingly, while the first surveillance 260 and the second surveillance 270 may receive the emitted signal 240 and attempt to detect, intercept, or exploit the signal, the poor autocorrelation of the emitted signal 240 makes it difficult to coordinate such efforts and, for example, geolocate the transmitter 220 from the received signals.

Figure 3:
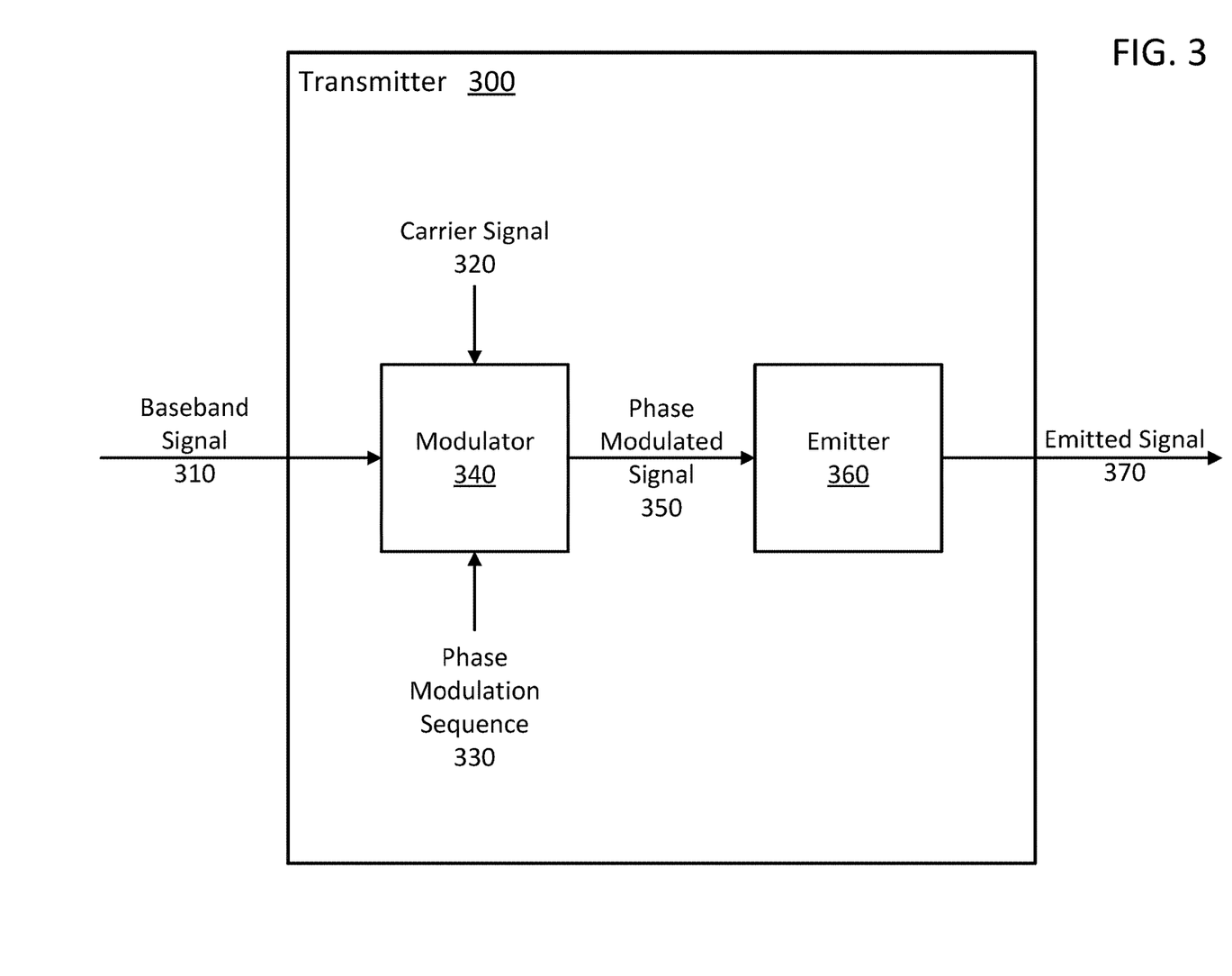
FIG. 3 is a block diagram of an example transmitter for phase modulating and emitting a signal having poor autocorrelation, according to an embodiment of the present disclosure.

FIG. 3 is a block diagram of an example transmitter 300 for phase modulating and emitting a signal 370 having poor autocorrelation, according to an embodiment of the present disclosure. Portions of the transmitter 300 and other electronic components and techniques described herein can be implemented as (or on) an electronic processing component, such as a computer, a field programmable gate array (FPGA), a microprocessor, or the like. For example, portions of the transmitter 300 and other components or methods can be implemented in hardware or software, or some combination of the two. For instance, portions of the transmitter 300 can be implemented as a microprocessor with instructions encoded therein that, when executed, cause the microprocessor to carry out some of the tasks of the transmitter 300. In another embodiment, portions of the transmitter 300 may be implemented as a custom circuit such as a field programmable gate array (FPGA) configured to carry out these tasks. In a further example, there are one or more memory units (such as non-volatile memory units) that is or are coupled to the processing component.

For example, portions of the transmitter 300 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit.

As will be further appreciated, a circuit as used herein is a physical structure capable of carrying out one or more functionalities as variously provided herein, whether the structure be hardware only such as purpose-built semiconductor (e.g., gate-level logic or application specific integrated circuit) or a printed circuit board populated with discrete components configured and arranged to carry out the various functionalities provided herein, or a processor-based system programmed with computer code or instructions that are executable by the processor-based system to carry out the various functionalities provided herein, or a combination of such hardware and software based architectures (e.g., printed circuit board with one or more embedded routines executable by one or more processors). Numerous such embodiments and configurations will be appreciated in light of this disclosure.

Continuing with FIG. 3, a baseband signal 310 is provided to the transmitter 300, and in particular, to a modulator 340. The baseband signal 310 can be, for example, data to be sent to an intended receiver, or a key or identifier to label (such as uniquely label) a radar pulse for remote sensing. The baseband signal 310 can be, for example, encoded or encrypted data to frustrate attempts by unintended recipients to make use of the baseband signal 310. The modulator 340 takes the baseband signal 310 together with a carrier signal 320 and a phase modulation sequence 330, and phase modulates the carrier signal 320 with the baseband signal 310 using the phase modulation sequence 330 to produce a phase modulated signal 350.

According to one or more embodiments, and as described further below, the phase modulated signal 350 has poor autocorrelation, has a corresponding mismatched filter based on the phase modulation sequence 330, and is configured to demodulate into the baseband signal 310 through poor cross-correlation with the mismatched filter. The mismatched filter thus functions as a security key without which, an unintended recipient is unable (or is not practical) to demodulate the phase modulated signal 350 to recover the baseband signal 310. The mismatched filter can be provided only to intended recipients. The phase modulated signal 350 is provided to an emitter 360 (such as an antenna, or an amplifier followed by an antenna) to emit the phase modulated signal as an emitted signal 370. In some embodiments, the emitted signal 370 is directed to an intended recipient. In some other embodiments, the emitted signal 370 is directed at one or more targets (e.g., to reflect off the targets, as in a remote sensing application like radar).

Figure 4:
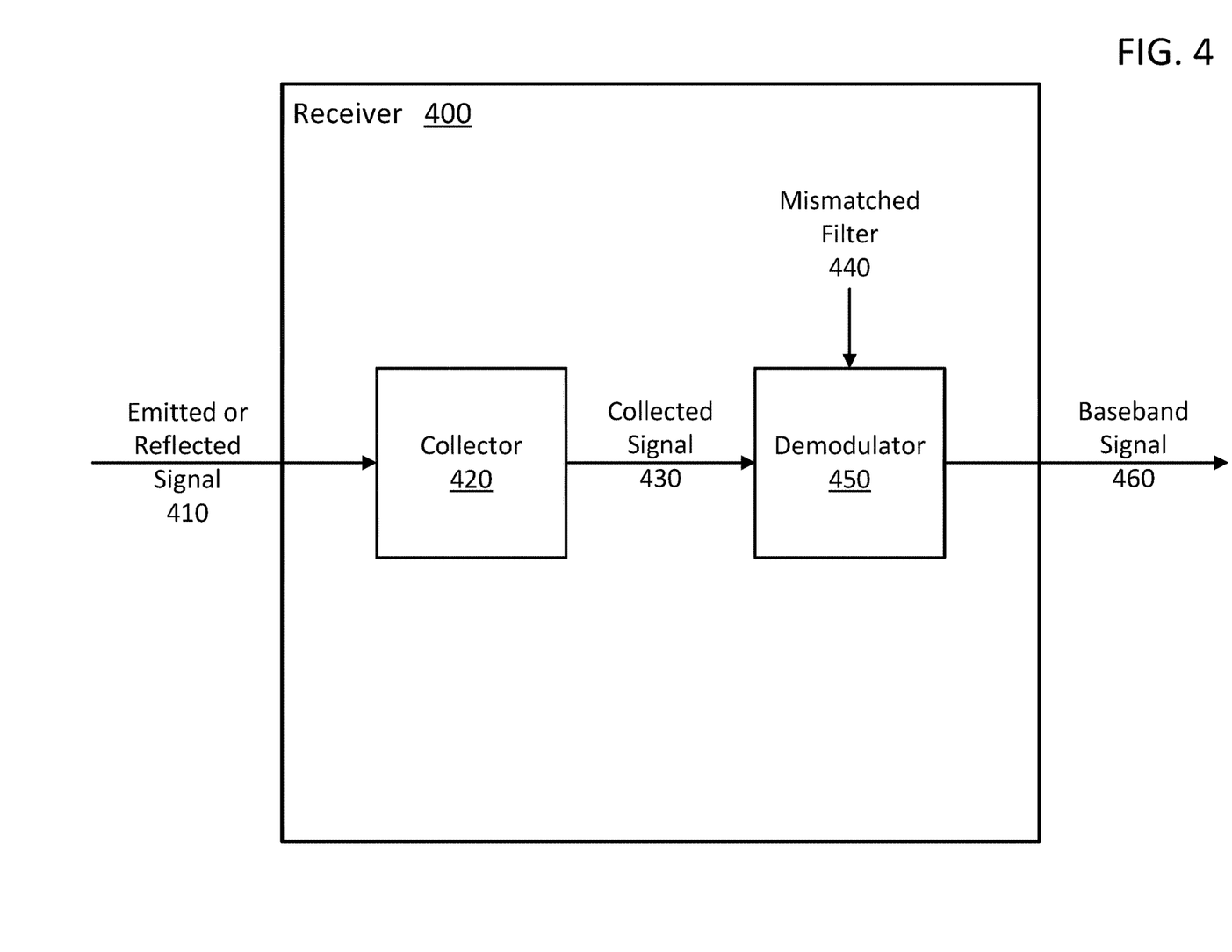
FIG. 4 is a block diagram of an example receiver for collecting and demodulating an emitted or reflected signal having poor autocorrelation, according to an embodiment of the present disclosure.

FIG. 4 is a block diagram of an example receiver 400 for collecting and demodulating an emitted or reflected signal 410 having poor autocorrelation, according to an embodiment of the present disclosure. The emitted or reflected signal 410 is from a phase modulated signal having the poor autocorrelation. The phase modulated signal also has a corresponding mismatched filter 440. For example, the mismatched filter 440 is generated as part of the design of the phase modulation of a carrier signal by the corresponding transmitter, such as part of generating a phase modulation sequence used to phase modulate the carrier signal with a baseband signal 460 to create the phase modulated signal. The phase modulated signal is configured to demodulate into the baseband signal 460 through poor cross-correlation with the mismatched filter 440. The emitted or reflected signal 410 is received by a collector 420 (such as an antenna, or an antenna followed by an amplifier) to produce a collected signal 430. The collected signal 430 is provided to a demodulator 450. The demodulator 450 takes the collected signal 430 and applies the mismatched filter 440. The poor cross-correlation of the underlying phase modulated signal and the mismatched filter 440 allows the baseband signal 460 to be recovered from the collected signal 430.

Figure 5:
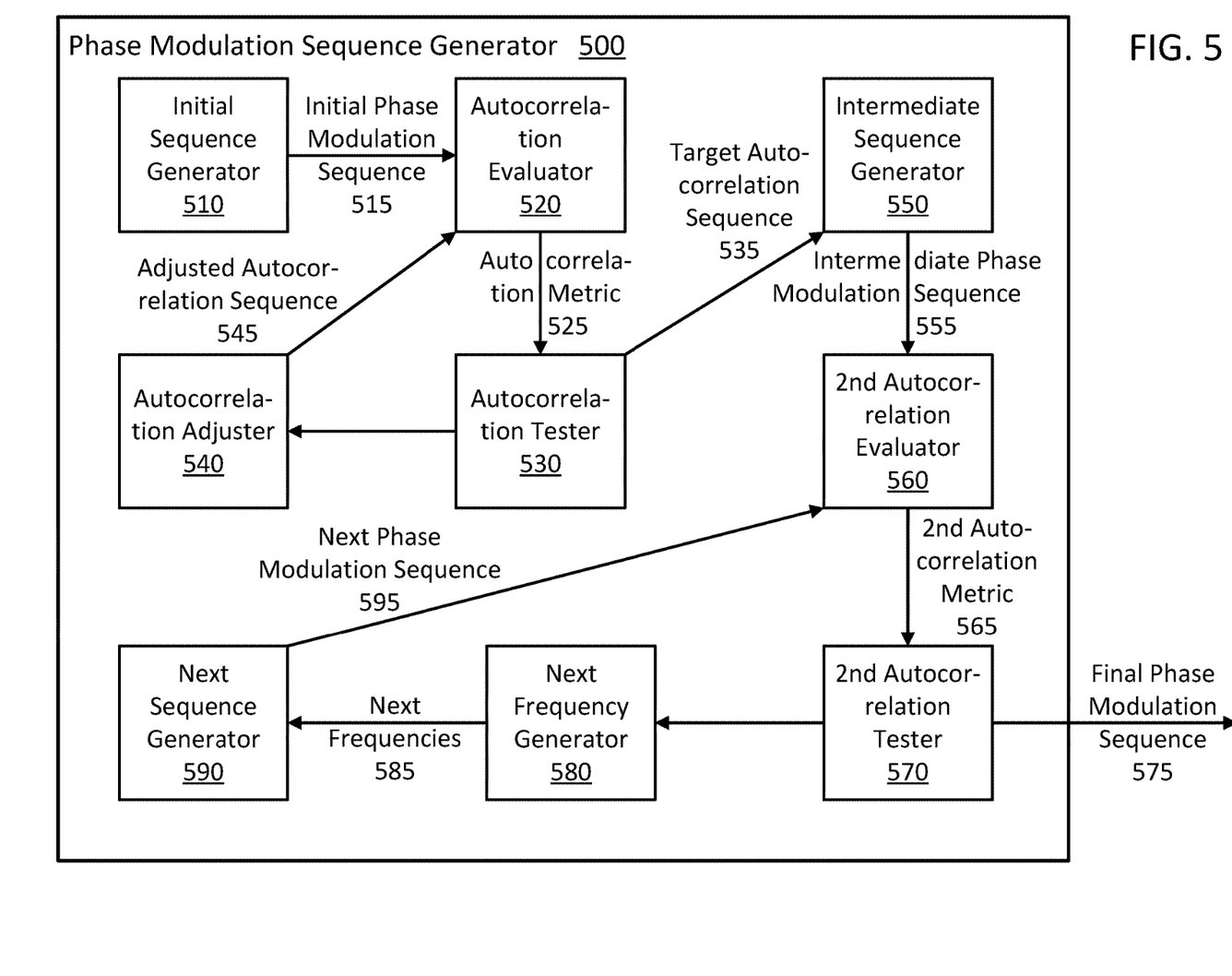
FIG. 5 is a block diagram of an example phase modulation sequence generator for generating a modulation sequence for phase modulating and emitting a signal having poor autocorrelation, such as the emitted signal of the transmitter of FIG. 3, according to an embodiment of the present disclosure.

FIG. 5 is a block diagram of an example phase modulation sequence generator 500 (e.g., microprocessor, FPGA, or other processing circuit) for generating a modulation sequence 575 for phase modulating and emitting a signal having poor autocorrelation, such as the emitted signal 370 of the transmitter 300 of FIG. 3, according to an embodiment of the present disclosure. The phase modulation sequence generator 500 (and each of its various components) can be an electronic circuit implemented in hardware, software (such as to be run on an electronic processor), or some combination of both. In the phase modulation sequence generator 500, the phase modulation sequence 575 is generated iteratively. As such, the generated phase modulation sequence is referred to as the final phase modulation sequence 575. The phase modulation sequence generator 500 includes an initial sequence generator 510. The initial sequence generator 510 generates an initial phase modulation sequence 515. The initial phase modulation sequence 515 can be, for example, a simple phase modulation sequence, such as a random binary phase-shift keying (BPSK) sequence. Other phase modulation sequences can also be used for the initial phase modulation sequence 515, but they increase the complexity of generating the final phase modulation sequence 575.

The initial phase modulation sequence 515 has good or excellent autocorrelation (e.g., peaked and maximal about zero delay, flat and minimal everywhere else). The autocorrelation of the initial phase modulation sequence 515 forms an initial autocorrelation sequence having the same length as the initial phase modulation sequence 515 (such as several hundred or a few thousand points, with more points making it harder to detect or intercept the underlying baseband signal, but also decreasing the information bandwidth). Because of the good autocorrelation, the initial autocorrelation sequence has a single peak of near maximal value, and significantly lower (such as near minimal) values elsewhere. The peak can be assumed to occur in the middle (e.g., middle point K) of the initial autocorrelation sequence.

The initial phase modulation sequence 515 (or the initial autocorrelation sequence) is input to an autocorrelation evaluator 520, which evaluates the initial autocorrelation sequence (e.g., determines how bad the autocorrelation is) and outputs an autocorrelation metric 525. For example, the autocorrelation evaluator 520 can compute or otherwise determine a Barankin metric (as the autocorrelation metric 525) to evaluate how close the initial autocorrelation sequence is to the worst possible autocorrelation (such as the Barankin Bound).

Since the phase modulation sequence generator 500 generates the final phase modulation sequence 575 having poor autocorrelation, and the initial autocorrelation sequence has very good autocorrelation, the phase modulation sequence generator 500 uses a feedback loop (including the autocorrelation evaluator 520, an autocorrelation tester 530, and an autocorrelation adjuster 540) to generate a target autocorrelation sequence 535 having poor autocorrelation (e.g., flat and close to maximal at all points). As mentioned above, an emitted signal having poor autocorrelation thwarts efforts of unintended recipients to detect, intercept, or exploit the emitted signal. Approaching the Barankin Bound when maximizing autocorrelation for all points includes maximizing signal to noise ratio (SNR) while minimizing distinctions within the autocorrelation sequence (such as by maximizing sidelobes). The feedback loop attempts to do the latter: decrease the range accuracy of geolocation techniques by increasing the ambiguity presence due to sidelobes as a function of the waveform design.

In further detail, the autocorrelation tester 530 tests if the autocorrelation metric 525 is sufficiently large, such as within 10% (or similar percentage, such as 5% or 20%) of the Barankin Bound (or other upper bound indicative of poor autocorrelation). If the autocorrelation metric 525 is sufficiently large, the autocorrelation sequence is passed (as the target autocorrelation sequence 535) to an intermediate sequence generator 550. Otherwise, control passes to the autocorrelation adjuster 540. The autocorrelation adjuster 540 adjusts the autocorrelation sequence (to generate an adjusted autocorrelation sequence 545) in such a way to move the corresponding autocorrelation metric 525 closer to the upper bound. For example, the autocorrelation adjuster 540 can remap the autocorrelation sequence to grow the sidelobes and generate the adjusted autocorrelation sequence 545 whose autocorrelation metric 525 is closer to the upper bound.

In some embodiments, this remapping is done three points in the autocorrelation sequence at a time. These points include a first point I in the first half of the autocorrelation sequence (e.g., the left sidelobes), a second point J in the second half of the autocorrelation sequence (e.g., the right sidelobes), and the middle point K (having near maximal autocorrelation value) between I and J in the autocorrelation sequence. The distinctions within the autocorrelation sequence are minimized by setting the autocorrelation values at points I and J so that the sum of these two autocorrelation values equals the autocorrelation value at the point J-I. By choosing different such pairs of points I and J and adjusting their autocorrelation values accordingly, an arbitrarily bad autocorrelation sequence (e.g., the target autocorrelation sequence 535) is generated. The target autocorrelation sequence 535 has a corresponding target autocorrelation metric (from the autocorrelation evaluator 520) that is used as a target for generating the final phase modulation sequence 575.

The intermediate sequence generator 550 takes the target autocorrelation sequence 535 and generates an intermediate phase modulation sequence 555 like the initial phase modulation sequence 515, such as a simple phase modulation sequence (e.g., a BPSK sequence). The intermediate phase modulation sequence 555 corresponds to the target autocorrelation sequence 535. For example, the intermediate phase modulation sequence 555 can be a regeneration of the initial phase modulation sequence 515, only this time based on the target autocorrelation metric, to the extent a binary (e.g., two symbol alphabet) phase modulated sequence such as a BPSK sequence permits.

While the intermediate phase modulation sequence 555 has significantly worse autocorrelation (due to its correspondence with the target autocorrelation sequence 535 and its basing on the target autocorrelation metric) than the initial phase modulation sequence 515, this autocorrelation can still be significantly short of the desired bad autocorrelation of the final phase modulation sequence 575. Accordingly, the phase modulation sequence generator 500 uses a second feedback loop (including a second autocorrelation evaluator 560, a second autocorrelation tester 570, a next frequency generator 580, and a next sequence generator 590) to iteratively generate phase modulation sequences having successively worse autocorrelation metrics until the final phase modulation sequence 575 (having the desired poor autocorrelation) is generated.

In further detail, the second autocorrelation evaluator 560 computes or otherwise determines the Barankin metric (as a second autocorrelation metric 565) to evaluate how close the autocorrelation metric of the intermediate phase modulation sequence 555 (or next phase modulation sequence 595) is to the target autocorrelation metric (of the target autocorrelation sequence 535). The second autocorrelation tester 570 tests if the second autocorrelation metric 565 is sufficiently large, such as within 10% (or similar percentage, such as 5% or 20%) of the target autocorrelation metric. If the second autocorrelation metric 565 is sufficiently large, the second autocorrelation tester 570 outputs the phase modulation sequence (such as the next phase modulation sequence 595)

as the final phase modulation sequence 575. Otherwise, control passes to the next frequency generator 580.

The next frequency generator 580 generates a next set of frequencies 585 (based on the frequency domain expansion of the target autocorrelation sequence 535) that minimizes the differences between the target autocorrelation sequence 535 and the autocorrelation sequence of the current phase modulation sequence (e.g., the intermediate phase modulation sequence 555 or the next phase modulation sequence 595). The next frequencies 585 are used by the next sequence generator 590 to generate a next phase modulation sequence 595, such as a multiple phase shift keying (MPSK) sequence having a larger alphabet than the current phase modulation sequence (e.g., several hundred or even a few thousand symbols on the unit circle, such as a set of constellation points corresponding to numerous roots of unity, including complex roots of unity). The next sequence generator 590 generates the next phase modulation sequence 595 to minimize the differences between the next frequencies 585 and those of the frequency domain expansion of the target autocorrelation sequence 535.

The next phase modulation sequence 595 is then evaluated by the second autocorrelation evaluator 560. At this point, the second feedback loop repeats itself until a phase modulation sequence (namely the final phase modulation sequence 575) having a sufficiently bad autocorrelation is generated. The final phase modulation sequence 575 is an arbitrary phase sequence meeting (or nearly meeting) the metric of the derived autocorrelation sequence (namely, the target autocorrelation sequence 535). The final phase modulation sequence 575 could be used as a spreading sequence that can be applied to an information sequence while corrupting the ability to geolocate the transmitter.

For demodulation at an intended recipient (such as a receiver or sensor), a corresponding sequence with a poor cross-correlation (e.g., peaked, as with a good autocorrelation sequence having a high peak at delay offset zero and low integrated sidelobes) is generated. The demodulation sequence properly detects the arbitrary phased sequence (final phase modulation sequence 575) while restoring range estimation for receivers knowing the sequence. To this end, the demodulation sequence is generated to maximize the cross-correlation at lag zero and minimize cross-correlation at all other lags. The demodulation sequence is equivalent to a set of complementary mismatched filter coefficients that create a relatively flat power spectral density (PSD).

Given this, pairs of orthogonal waveforms having poor autocorrelation properties can be generated. The orthogonal waveforms lead to inaccurate geolocation when intercepted and have corresponding poor cross-correlation properties with secondary sequences (e.g., demodulation sequences), stored on receivers, providing for good de-spreading properties. The demodulation sequences act like keys between senders and receivers to defeat exploitation of detected or intercepted signals by unintended recipients. For instance, this exploitation can be thwarted by restoring the threshold SNR of the upper bound (such as the Barankin Bound) to a ratio near or lower than that of the receiver's SNR.

Numerous other architectures, systems, and embodiments will be apparent in light of this disclosure.

Methodology

Figure 6:
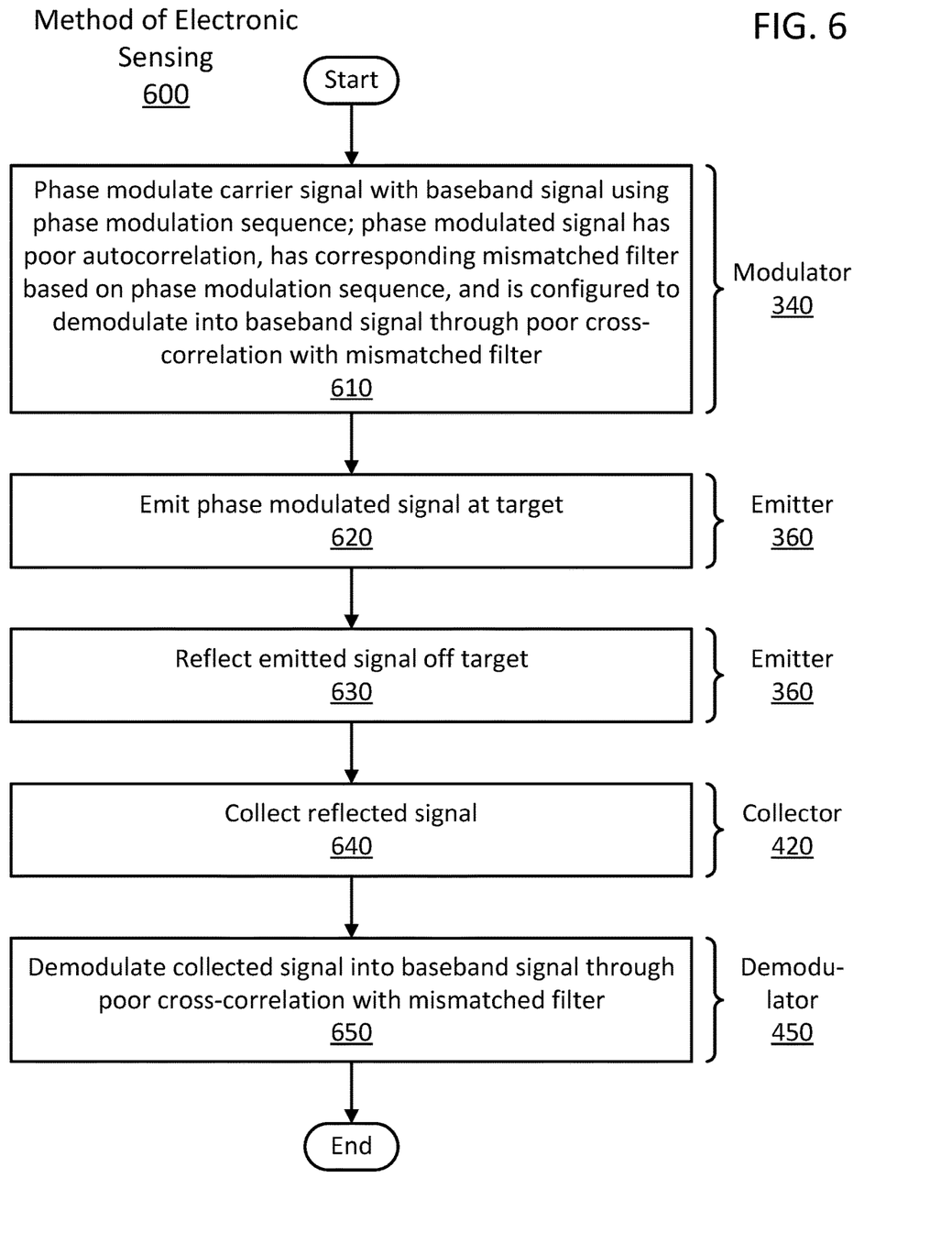
FIG. 6 is a flow diagram of an example method of electronic sensing using a phase modulated signal having poor autocorrelation, according to an embodiment of the present disclosure.

FIG. 6 is a flow diagram of an example method 600 of electronic sensing, according to an embodiment of the present disclosure. The method 600 may be performed, for example, by the transmitter 300 of FIG. 3 and receiver 400 of FIG. 4. More generally, the method 600 and other methods described herein may be implemented in hardware or combinations of hardware and software. For example, the method 600 may be implemented by the components of FIGS. 1-5. In some embodiments, the method 600 may be performed in conjunction with a special purpose processor, such as a signal processor.

In some other embodiments, some of the method 600 may be implemented as a series of computer instructions, such as software, firmware, or a combination of the two, together with one or more computer processors (e.g., one or more microprocessors). The instructions, when executed on a given processor, cause portions of the method 600 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 600 (or other method described herein) to be carried out for transmitting or receiving signals having poor autocorrelation. In addition, while the methods described herein may appear to have a certain order to their operations, other embodiments may not be so limited. Accordingly, the order of the operations can be varied between embodiments, as would be apparent in light of this disclosure.

The method 600 of FIG. 6 includes a modulator (such as modulator 340) phase modulating 610 a carrier signal (such as carrier signal 320) with a baseband signal (such as baseband signal 310) using a phase modulation sequence (such as phase modulation sequence 330). The phase modulated signal (such as phase modulated signal 350) has poor autocorrelation, has a corresponding mismatched filter (such as mismatched filter 440) based on the phase modulation sequence, and is configured to demodulate into the baseband signal through poor cross-correlation with the mismatched filter. The method 600 further includes an emitter (such as emitter 360) emitting 620 the phase modulated signal at a target (such as first target 150 or second target 160), and reflecting 630 the emitted signal (such as emitted signal 370) off the target. The method 600 further includes a collector (such as collector 420) collecting 640 the reflected signal (such as reflected signal 170 or reflected signal 180). The method 600 further includes a demodulator (such as demodulator 450) demodulating 650 the collected signal (such as collected signal 430) into the baseband signal through the poor cross-correlation with the mismatched filter.

Figure 7:
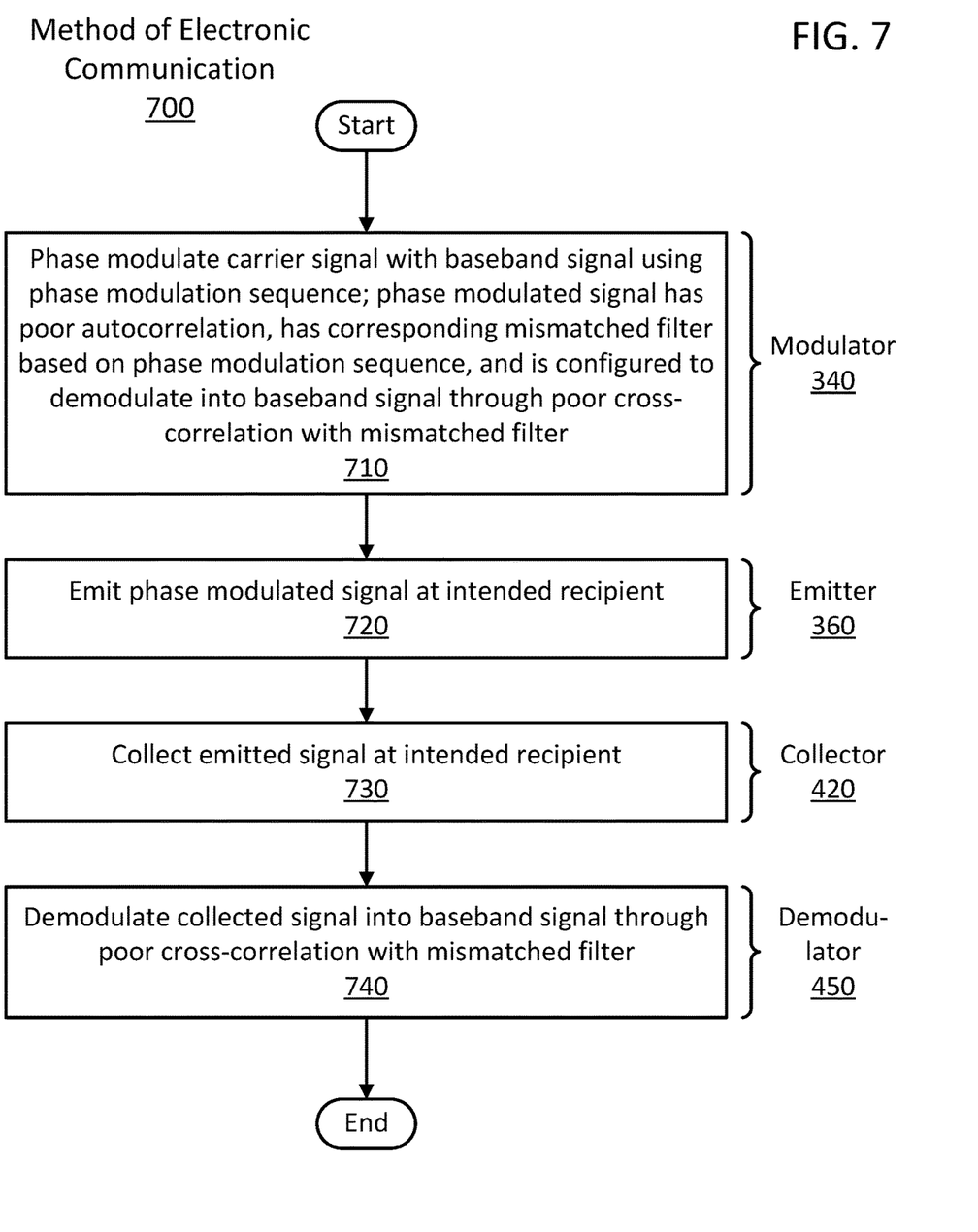
FIG. 7 is a flow diagram of an example method of electronic communication using a phase modulated signal having poor autocorrelation, according to an embodiment of the present disclosure.

FIG. 7 is a flow diagram of an example method 700 of electronic communication, according to an embodiment of the present disclosure. The method 700 includes a modulator phase modulating 710 a carrier signal with a baseband signal using a phase modulation sequence. The phase modulated signal has poor autocorrelation, has a corresponding mismatched filter based on the phase modulation sequence, and is configured to demodulate into the baseband signal through poor cross-correlation with the mismatched filter. The method 700 further includes an emitter emitting 720 the phase modulated signal to an intended recipient (such as intended recipient 250). The method 700 further includes a collector at the intended recipient collecting 730 the emitted signal (such as emitted signal 240). The method 700 further includes a demodulator demodulating 740 the collected signal into the baseband signal through the poor cross-correlation with the mismatched filter.

Figure 8:
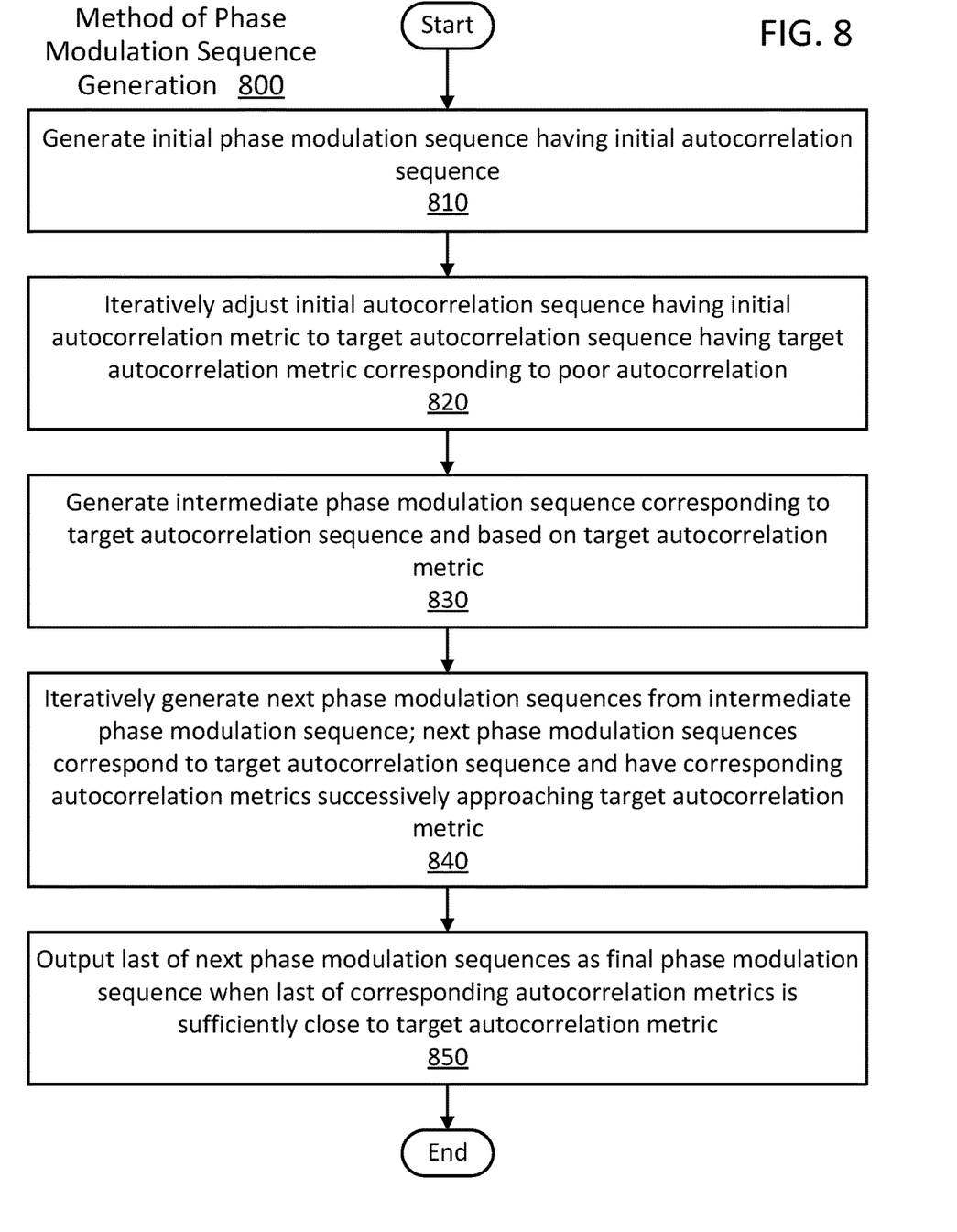
FIG. 8 is a flow diagram of an example method of phase modulation sequence generation for phase modulating and emitting a signal having poor autocorrelation, such as the emitted signal of the transmitter of FIG. 3, according to an embodiment of the present disclosure.

FIG. 8 is a flow diagram of an example method 800 of phase modulation sequence generation for phase modulating and emitting a signal having poor autocorrelation, such as the emitted signal 370 of the transmitter 300 of FIG. 3, according to an embodiment of the present disclosure. In the method 800, a final phase modulation sequence (such as final phase modulation sequence 575) is generated for a modulator (such as modulator 340). The modulator modulates a carrier signal (such as carrier signal 320) with a baseband signal (such as baseband signal 310) using the final phase modulation sequence. The final phase modulation sequence is generated, for example, by a sequence generation circuit. The method 800 includes generating 810 an initial phase modulation sequence (such as initial phase modulation sequence 515) having an initial autocorrelation sequence, and iteratively adjusting 820 the initial autocorrelation sequence having the initial autocorrelation metric to a target autocorrelation sequence (such as target autocorrelation sequence 535) having a target autocorrelation metric corresponding to the poor autocorrelation (such as the poor autocorrelation of the emitted signal 370).

The method 800 further includes generating 830 an intermediate phase modulation sequence (such as intermediate phase modulation sequence 555) corresponding to the target autocorrelation sequence and based on the target autocorrelation metric, and iteratively generating 840 next phase modulation sequences (such as next phase modulation sequence 595) from the intermediate phase modulation sequence. The next phase modulation sequences correspond to the target autocorrelation sequence and have corresponding autocorrelation metrics (such as second autocorrelation metric 565) successively approaching the target autocorrelation metric. The method 800 further includes outputting 850 a last of the next phase modulation sequences as the final phase modulation sequence when a last of the corresponding autocorrelation metrics is sufficiently close to (such as within 10% of) the target autocorrelation metric.

Numerous other methods and techniques will be apparent in light of this disclosure.

Further Example Embodiments

The following examples pertain to further embodiments, from which numerous permutations and configurations will be apparent.

Example 1 is an electronic transmitter including: a modulator to phase modulate a carrier signal with a baseband signal using a phase modulation sequence, wherein the phase modulated signal has poor autocorrelation, has a corresponding mismatched filter based on the phase modulation sequence, and is configured to demodulate into the baseband signal through poor cross-correlation with the mismatched filter; and an emitter to emit the phase modulated signal.

Example 2 is an electronic sensing apparatus including: the transmitter of Example 1, wherein the emitter is further to emit the phase modulated signal at a target and the emitted signal is configured to reflect off the target; and a receiver including a collector to collect the reflected signal, and a demodulator to demodulate the collected signal into the baseband signal through the poor cross-correlation with the mismatched filter.

Example 3 is an electronic communication system including: the transmitter of Example 1, wherein the emitter is further to emit the phase modulated signal to an intended recipient; and a receiver at the intended recipient and including a collector to collect the emitted signal, and a demodulator to demodulate the collected signal into the baseband signal through the poor cross-correlation with the mismatched filter.

Example 4 includes the transmitter of Example 1, wherein the phase modulation sequence is a final phase modulation sequence generated by a sequence generation circuit configured to: generate an initial phase modulation sequence having an initial autocorrelation sequence; iteratively adjust the initial autocorrelation sequence having the initial autocorrelation metric to a target autocorrelation sequence having a target autocorrelation metric corresponding to the poor autocorrelation; generate an intermediate phase modulation sequence corresponding to the target autocorrelation sequence and based on the target autocorrelation metric; iteratively generate next phase modulation sequences from the intermediate phase modulation sequence, the next phase modulation sequences corresponding to the target autocorrelation sequence and having corresponding autocorrelation metrics successively approaching the target autocorrelation metric; and output a last of the next phase modulation sequences as the final phase modulation sequence when a last of the corresponding autocorrelation metrics is sufficiently close to the target autocorrelation metric.

Example 5 includes the transmitter of Example 4, wherein the target autocorrelation metric is sufficiently close to a worst autocorrelation metric.

Example 6 includes the transmitter of Example 5, wherein the worst autocorrelation metric is the Barankin Bound.

Example 7 includes the transmitter of Example 4, wherein the sequence generation circuit is further configured to iteratively generate the next phase modulation sequences by iteratively: generating a next set of frequencies based on a frequency domain expansion of the target autocorrelation sequence and that minimizes differences between the target autocorrelation sequence and the autocorrelation sequence of a current one of the next phase modulation sequences; and generating a next one of the next phase modulation sequences that minimizes differences between the next set of frequencies and those of the frequency domain expansion of the target autocorrelation sequence.

Example 8 includes the transmitter of Example 4, wherein the sequence generation circuit is further configured to generate the mismatched filter from the final phase modulation sequence.

Example 9 is a method of electronic transmission, the method including phase modulating a carrier signal with a baseband signal using a phase modulation sequence by a modulator, wherein the phase modulated signal has poor autocorrelation, has a corresponding mismatched filter based on the phase modulation sequence, and is configured to demodulate into the baseband signal through poor cross-correlation with the mismatched filter; and emitting the phase modulated signal using an emitter.

Example 10 is a method of electronic sensing including: performing the method of Example 9, wherein emitting the phase modulated signal includes emitting the phase modulated signal at a target; reflecting the emitted signal off the target; collecting the reflected signal using a collector; and demodulating, with a demodulator, the collected signal into the baseband signal through the poor cross-correlation with the mismatched filter.

Example 11 is a method of electronic communication including: performing the method of Example 9, wherein emitting the phase modulated signal includes emitting the phase modulated signal to an intended recipient; collecting the emitted signal using a collector at the intended recipient;

and demodulating, with a demodulator, the collected signal into the baseband signal through the poor cross-correlation with the mismatched filter.

Example 12 is an electronic receiver including: a collector to collect an emitted or reflected signal, wherein the emitted or reflected signal is from a phase modulated signal generated using a phase modulation sequence, and the phase modulated signal has poor autocorrelation, has a corresponding mismatched filter based on the phase modulation sequence, and is configured to demodulate into a baseband signal through poor cross-correlation with the mismatched filter; and a demodulator to demodulate the collected signal into the baseband signal through the poor cross-correlation with the mismatched filter.

Example 13 is an electronic sensing apparatus including: the receiver of Example 12, wherein the emitted or reflected signal is a reflected signal off a target; and a transmitter including a modulator to phase modulate the baseband signal into the phase modulated signal, and an emitter to emit the phase modulated signal at the target, wherein the emitted signal is to reflect off the target to become the reflected signal.

Example 14 is an electronic communication system including: the receiver of Example 12, wherein the emitted or reflected signal is an emitted signal; and a transmitter including a modulator to phase modulate the baseband signal into the phase modulated signal, and an emitter to emit the phase modulated signal as the emitted signal at the collector.

Example 15 is a method of phase modulation sequence generation using a processing circuit, the generated phase modulation sequence being a final phase modulation sequence used to phase modulate a carrier signal with a baseband signal to create a phase modulated signal having poor autocorrelation and a corresponding mismatched filter based on the phase modulation sequence, the phase modulated signal being configured to demodulate into the baseband signal through poor cross-correlation with the mismatched filter, the method including: generating, by the processing circuit, an initial phase modulation sequence having an initial autocorrelation sequence; iteratively adjusting, by the processing circuit, the initial autocorrelation sequence having an initial autocorrelation metric to a target autocorrelation sequence having a target autocorrelation metric corresponding to the poor autocorrelation; generating, by the processing circuit, an intermediate phase modulation sequence corresponding to the target autocorrelation sequence and based on the target autocorrelation metric; iteratively generating, by the processing circuit, next phase modulation sequences from the intermediate phase modulation sequence, the next phase modulation sequences corresponding to the target autocorrelation sequence and having corresponding autocorrelation metrics successively approaching the target autocorrelation metric; and outputting, by the processing circuit, a last of the next phase modulation sequences as the final phase modulation sequence when a last of the corresponding autocorrelation metrics is sufficiently close to the target autocorrelation metric.

Example 16 includes the method of Example 15, wherein the target autocorrelation metric is sufficiently close to a worst autocorrelation metric.

Example 17 includes the method of Example 16, wherein the worst autocorrelation metric is the Barankin Bound.

Example 18 includes the method of Example 15, wherein iteratively generating the next phase modulation sequences includes iteratively: generating a next set of frequencies based on a frequency domain expansion of the target autocorrelation sequence and that minimizes differences between the target autocorrelation sequence and the autocorrelation sequence of a current one of the next phase modulation sequences; and generating a next one of the next phase modulation sequences that minimizes differences between the next set of frequencies and those of the frequency domain expansion of the target autocorrelation sequence.

Example 19 includes the method of Example 15, further including generating, by the processing circuit, the mismatched filter from the final phase modulation sequence.

Example 20 is a computer program product including one or more non-transitory machine-readable storage mediums having instructions encoded thereon for generating the final phase modulation sequence by the method of Example 15 using the processing circuit.

Example 21 is a system for phase modulation sequence generation, the system including: the computer program product of Example 20; and the processing circuit to execute the encoded instructions to generate the final phase modulation sequence.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. An electronic sensing apparatus comprising:
a modulator to phase modulate a carrier signal with a baseband signal using a phase modulation sequence, wherein the phase modulated signal has poor autocorrelation;
an emitter to emit the phase modulated signal; and
a receiver, wherein the receiver includes
a collector to collect the emitted phase modulated signal, and
a demodulator to demodulate the phase modulated signal into the baseband signal through poor cross-correlation with a mismatched filter, wherein the mismatched filter is based on the phase modulated sequence.

2. The electronic sensing apparatus of claim 1, wherein the emitter is further configured to emit the phase modulated signal at a target and the emitted signal is configured to reflect off the target to generate a reflected signal; and the collector to collect the reflected signal.

3. The electronic sensing apparatus of claim 1, wherein the emitter is further configured to emit the phase modulated signal to an intended recipient; and the receiver is at the intended recipient.

4. The electronic sensing apparatus of claim 1, wherein the phase modulation sequence is a final phase modulation sequence generated by a sequence generation circuit configured to:
generate an initial phase modulation sequence having an initial autocorrelation sequence;
iteratively adjust the initial autocorrelation sequence having an initial autocorrelation metric to a target autocorrelation sequence having a target autocorrelation metric corresponding to the poor autocorrelation;
generate an intermediate phase modulation sequence corresponding to the target autocorrelation sequence and based on the target autocorrelation metric;
iteratively generate next phase modulation sequences from the intermediate phase modulation sequence, the next phase modulation sequences corresponding to the target autocorrelation sequence and having corresponding autocorrelation metrics successively approaching the target autocorrelation metric; and
output a last of the next phase modulation sequences as the final phase modulation sequence when a last of the corresponding autocorrelation metrics is sufficiently close to the target autocorrelation metric.

5. The electronic sensing apparatus of claim 4, wherein the target autocorrelation metric is sufficiently close to a worst autocorrelation metric.

6. The electronic sensing apparatus of claim 5, wherein the worst autocorrelation metric is the Barankin Bound.

7. The electronic sensing apparatus of claim 4, wherein the sequence generation circuit is further configured to iteratively generate the next phase modulation sequences by iteratively:
generating a next set of frequencies based on a frequency domain expansion of the target autocorrelation sequence and that minimizes differences between the target autocorrelation sequence and the autocorrelation sequence of a current one of the next phase modulation sequences; and
generating a next one of the next phase modulation sequences that minimizes differences between the next set of frequencies and those of the frequency domain expansion of the target autocorrelation sequence.

8. The electronic sensing apparatus of claim 4, wherein the sequence generation circuit is further configured to generate the mismatched filter from the final phase modulation sequence.

9. A method of electronic sensing, the method comprising:
phase modulating a carrier signal with a baseband signal using a phase modulation sequence by a modulator, wherein the phase modulated signal has poor autocorrelation;
emitting the phase modulated signal using an emitter;
collecting the emitted phase modulated signal using a collector; and
demodulating, with a demodulator, the collected signal into the baseband signal through poor cross-correlation with a mismatched filter, wherein the mismatched filter is based on the phase modulated sequence.

10. The method of claim 9, wherein emitting the phase modulated signal comprises
emitting the phase modulated signal at a target to generate a reflected signal;
reflecting the emitted phase modulated signal off the target; and
collecting the reflected signal using the collector.

11. The method of claim 9, wherein emitting the phase modulated signal comprises emitting the phase modulated signal to an intended recipient; and wherein the collector is at the intended recipient.

12. An electronic receiver comprising:
a collector to collect an emitted or reflected signal, wherein the emitted or reflected signal is from a phase modulated signal generated using a phase modulation sequence, and the phase modulated signal
has poor autocorrelation,
has a corresponding mismatched filter based on the phase modulation sequence, and
is configured to demodulate into a baseband signal through poor cross-correlation with the mismatched filter; and
a demodulator to demodulate the collected emitted or reflected signal into the baseband signal through the poor cross-correlation with the mismatched filter.

13. An electronic sensing apparatus comprising:
the receiver of claim 12, wherein the emitted or reflected signal is a reflected signal off a target; and
a transmitter including
a modulator to phase modulate the baseband signal into the phase modulated signal, and
an emitter to emit the phase modulated signal at the target, wherein the emitted signal is to reflect off the target to become the reflected signal.

14. An electronic communication system comprising:
the receiver of claim 12, wherein the emitted or reflected signal is an emitted signal; and
a transmitter including
a modulator to phase modulate the baseband signal into the phase modulated signal, and
an emitter to emit the phase modulated signal as the emitted signal at the collector.

15. A method of phase modulation sequence generation using a processing circuit, the generated phase modulation sequence being a final phase modulation sequence used to phase modulate a carrier signal with a baseband signal to create a phase modulated signal having poor autocorrelation and a corresponding mismatched filter based on the phase modulation sequence, the phase modulated signal being configured to demodulate into the baseband signal through poor cross-correlation with the mismatched filter, the method comprising:
generating, by the processing circuit, an initial phase modulation sequence having an initial autocorrelation sequence;
iteratively adjusting, by the processing circuit, the initial autocorrelation sequence having an initial autocorrelation metric to a target autocorrelation sequence having a target autocorrelation metric corresponding to the poor autocorrelation;
generating, by the processing circuit, an intermediate phase modulation sequence corresponding to the target autocorrelation sequence and based on the target autocorrelation metric;
iteratively generating, by the processing circuit, next phase modulation sequences from the intermediate phase modulation sequence, the next phase modulation sequences corresponding to the target autocorrelation sequence and having corresponding autocorrelation metrics successively approaching the target autocorrelation metric; and
outputting, by the processing circuit, a last of the next phase modulation sequences as the final phase modulation sequence when a last of the corresponding autocorrelation metrics is sufficiently close to the target autocorrelation metric.

16. The method of claim 15, wherein the target autocorrelation metric is sufficiently close to a worst autocorrelation metric.

17. The method of claim 16, wherein the worst autocorrelation metric is the Barankin Bound.

18. The method of claim 15, wherein iteratively generating the next phase modulation sequences comprises iteratively:
  generating a next set of frequencies based on a frequency domain expansion of the target autocorrelation sequence and that minimizes differences between the target autocorrelation sequence and the autocorrelation sequence of a current one of the next phase modulation sequences; and
  generating a next one of the next phase modulation sequences that minimizes differences between the next set of frequencies and those of the frequency domain expansion of the target autocorrelation sequence.

19. The method of claim 15, further comprising generating, by the processing circuit, the mismatched filter from the final phase modulation sequence.

20. A computer program product including one or more non-transitory machine-readable storage mediums having instructions encoded thereon for generating the final phase modulation sequence by the method of claim 15 using the processing circuit.

* * * * *